3,636,093
RESOLUTION OF 2-METHYLENE CYCLOPROPANE CARBOXYLIC ACID
Alexander M. Hoinowski, Union, and David F. Hinkley, Plainfield, N.J., assignor to Merck & Co., Inc., Rahway, N.J.
No Drawing. Filed July 29, 1968, Ser. No. 748,215
Int. Cl. C07c *61/16*
U.S. Cl. 260—514 P        1 Claim

ABSTRACT OF THE DISCLOSURE

The racemic mixture of 2-methylenecyclopropane carboxylic acid is resolved into its antipodes and obtained in a pure state with high yields.

SUMMARY OF THE INVENTION

This invention relates to a new method for resolving *dl* 2-methylenecyclopropane carboxylic acid in nearly theoretical yield.

BACKGROUND OF THE INVENTION

When *dl* 2-methylenecyclopropane carboxylic acid is condensed with levo-α-5,9-diethyl-2′-hydroxy-6,7-benzomorphan, a diastereo isomeric amide mixture is obtained. Hydride reduction of this mixture has been found to give a mixture containing pronounced analgesic or pain-relieving property. Further, when *l* 2-methylenecyclopropane carboxylic acid is used in place of the *dl* 2-methylenecyclopropane carboxylic acid, a more active compound is obtained. The preparation of these highly desirous compounds is contained in U.S. Ser. No. 630,493.

Racemic 2-methylenecyclopropane carboxylic acid was previously reported as allegedly separated into its antipodes by resolution with brucine in water, $[\alpha]_D^{25} \pm 1.84°$ (neat), by Bottini and Davidson in the Journal of Organic Chemistry, 30, 3302 (1965). However, use of this slightly levo acid in reactions with optically active bases, such as the levo-benzomorphan, gives almost as bad optical results as the racemic acid itself and, based on increased and variable rotation ($-2.6°$) of the acid on further attempted resolution with brucine in solvents other than water, and with *d* and *l* phenethylamine in chloroform ($+4.0$ and $-3.3°$), and also on the much higher reported optical rotations of analogous cyclopropane acids, the indication is that the resolution of *dl* 2-methylenecyclopropane carboxylic acid with brucine is in fact almost nil.

DESCRIPTION AND PREFERRED EMBODIMENTS

This invention provides a new method of preparing pure *d* and *l* 2-methylenecyclopropane carboxylic acid by the resolution of *dl* 2-methylenecyclopropane carboxylic acid with cinchonidine that is both economical and noncomplicated. This invention further provides a method for obtaining *d* and *l* 2-methylenecyclopropane carboxylic acid in a high yield from readily available starting materials. It again provides a purification which does not result in complex mixtures of isomeric products that are still difficult to separate.

As a result of the unavailability of *d* and *l* 2-methylenecyclopropane carboxylic acid and the costs resulting from their complicated isolation, the use of these pure *d* and *l* acids has been limited. The ability to conveniently and economically synthesize pure *d* and *l* 2-methylenecyclopropane carboxylic acid also provides the utility for their use. They can now be economically employed as starting materials from which important medicinal compounds can be synthesized.

We have developed a procedure for the resolution of *dl* 2-methylenecyclopropane carboxylic acid with various bases which involves the formation of crude *l* salt, two crystallizations, liberation, and distillation with an overall optical yield of 44% of *d* and *l* 2-methylenecyclopropane carboxylic acid. The more preferred base used in this invention is cinchonidine.

In the preferred procedure, a hot aqueous solution of the racemic acid is treated with cinchonidine and the crude cinchonidine salt of *l* 2-methylenecyclopropane carboxylic acid separates upon cooling. This is then recrystallized from hot aqueous solution to give the pure *l* salt. Two recrystallizations are the most preferred. This resolution may also be carried out in an organic solvent such as chloroform, and may be recrystallized from various organic solvents such as acetone, chloroform or benzene. The pure *l* cyclopropane carboxylic acid is then liberated from its salt by methods well-known in the art, such as dissolution in aqueous acid (as aqueous sulfuric acid) and salting out of solution (such as with sodium sulfate), followed by extraction with an organic solvent (such as chloroform, ether, etc.), and isolation by known physical methods (such as vacuum distillation, column chromatography, vapor phase chromatography, etc.) The *d* 2-methylenecyclopropane carboxylic acid is then easily recovered from the cinchonidine salt liquors by acidification, followed by multiple extraction with an organic solvent (such as chloroform). Concentration of the liquors prior to extraction raises the amount of *d*-acid recovered.

Recovery and racemization of the *d*-acid, followed by re-resolution, is important since the fundamental synthesis of the cyclo-acid is costly from the economic standpoint.

Resolution with cinchonidine in water gives much higher rotation ($-21°$) on liberation of crude salts than with brucine. Purification of the crude salt and liberation gives pure *l*-acid, $[\alpha]_D^{24} -35.2°$ (neat oil), and *d*-acid, $[\alpha]_D^{24} +34.8°$ (neat). The pure levo-acid appears to be crystalline just slightly below room temperature.

It is also noted that the described resolution procedure is found to be effective with *dl*-acid even when contaminated with such impurities as chloroacetic acid. It is further noted that this invention is not limited to the use of cinchonidine alone, but may also be successfully carried out with *d* and *l* phenethylamine and with quinine.

This invention may be illustrated by the following reaction equations:

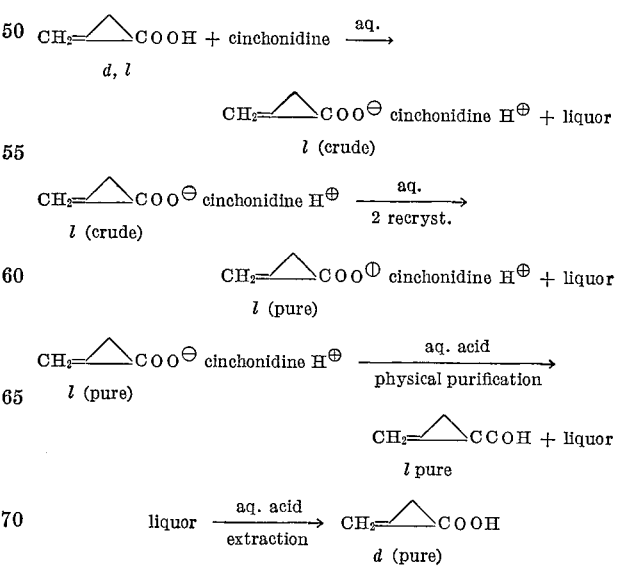

When the racemic form of 2-methylenecyclopropane carboxylic acid is condensed with α-5,9-diethyl-2′-hydroxy-6,7-benzomorphan and the resultant mixture is reduced, the analgesic pain-relieving mixture of dl α-2-methylenecyclopropylmethyl - 5,9 - diethyl - 2′ - hydroxy - 6,7-benzomorphan is obtained. There is much difficulty in resolving this mixture into its racemates, however, and considerable cost and time and low yields result. When pure d or l 2-methylenecyclopropane carboxylic acid is used, however, the d or l form of 2-methylenecyclopropylmethyl-5,9 - diethyl - 2′ - hydroxy - 6,7-benzomorphan is obtained pure and economically in good yields. This method further provides compounds which are much more active as analgesics and therefore pharmaceutically important.

2-methylenecyclopropane carboxylic acid is a known compound and can be prepared by the procedures of John A. Carbon, William B. Mortin and Leo R. Swett, J.A.C.S. 60, 1002 (1958) and E. F. Welman and W. J. Fanshout, J.A.C.S. 83, 2379 (1961). It is a potent irritant to the skin, highly toxic to the eyes, and highly toxic orally, and therefore care is necessary when handling this material. The partial resolution of 2-methylenecyclopropane carboxylic acid with brucine can be found in Bottini and Davidson, Journal of Organic Chemistry, 30, 3302 (1965).

Cinchonidine is commercially available. It is a very mildly toxic material and care should be exercised when handling it too.

The following are a group of detailed examples which show the purification of the racemates of this invention. They are to be construed as illustrations of the invention and not as limitations thereof.

EXAMPLE 1

Formation of (—)-cinchonidine-(—)-2-methylenecyclopropane carboxylate 40.0 grams of dl 2-methylenecyclopropane-1-carboxylic acid is dissolved in 8.0 liters of water at 80° C., followed by the slow addition (over 3 minutes to prevent lumping) of mortar ground cinchonidine. The slurry is heated with stirring to reflux where it is maintained for 0.5 hour and almost total solution is present. This is then filtered hot (95–100° C.), seeded with (—)-cinchonidine(—)-2-methylenecyclopropane carboxylate, and allowed to cool with stirring to ambient temperature. The melting point is 166–167° C.

The resulting slurry is filtered, the solid cake slurry washed with 400 ml. water and sucked on a funnel for an hour to afford a white crystalline solid which, for best results, is sent through the crystallization procedure described in the next step without further drying. Physical constants, determined on a small portion of this salt, vacuum dried at 100° C. for 3 hours, indicates a resolution yield of 82.3 grams, which is 102.5% based on the dried sample. The melting point is 159–161° C., $[\alpha]_D^{24}$—75.8° (c.=1, CHCl$_3$).

EXAMPLE 2

First recrystallization of (—)-cinchonidine(—)-2-methylenecyclopropane

To 4.2 liters of water at 70° C., 81.7 grams of crude cinchonidine salt is added, the slurry heated with agitation to reflux, stirred until almost total solution (5 minutes), and filtered at the boil. The filtrate is seeded with (—)-cinchonidine(—)-2-methylenecyclopropane carboxylic acid, M.P. 166–167° C., and allowed to cool with stirring over 3–4 hours to ambient temperature. The solid is filtered, slurry washed with 400 ml. of water and sucked dry on a funnel, and for best results, used in the final recrystallization without further drying. Physical constants determined on a small portion of this salt, vacuum dried at 100° C. for 3 hours, indicates a recovery yield of 58.7 grams, which is 71.3% based on the dried sample. The melting point is 162–163° C., $[\alpha]_D^{24}$—77.4° (c.=1, CHCl$_3$).

EXAMPLE 3

Second recrystallization of (—)-cinchonidine(—)-2-methylenecyclopropane carboxylate 58.0 grams of the partially purified cinchonidine salt is added to 2.95 liters of water at 70° C. The stirred slurry is heated to and maintained at reflux for 0.5 hour, filtered at the boil, and the hot filtrate seeded as in the prior crystallization.

The filtrate, which crystallizes at 95° C., is allowed to cool to ambient temperature, filtered, the crystalline precipitate slurry washed with 300 ml. water, and air-dried 0.5 hour. Physical constants determined on a fractional portion of this salt, vacuum dried at 100° C. for 3 hours, indicates a recovery yield of 43.8 grams, which is 75.4% based on the dried sample. The melting point is 164–165° C., $[\alpha]_D^{24}$—78.7° (c.=1, CHCl$_3$).

EXAMPLE 4

Liberation of (—)-2-methylenecyclopropane carboxylic acid 36.0 grams of the purified cinchonidine salt is acidified with 470 ml. of 0.4 N sulfuric acid, stirred until solution is complete, and then extracted with six 100 ml. portions of chloroform. The combined chloroform extract is dried over MgSO$_4$, concentrated in vacuo at less than 40° C. to a thin syrup, and then, after de-gassing, distilled in vacuo.

| Fraction | Pressure (mm. Hg) | Temp. (° C.) | Weight (g.) |
|---|---|---|---|
| 1 | 0.4 | 81 | 0.15 |
| 2 | 0.4 | 82–84 | 7.19 |

Physical constants are determined on the major fraction, the weight is 7.19 g., which is 79.9% recovery.

$$[\alpha]_D^{24}-35.2°$$

(neat), $[\alpha]_D^{24}$—38.3° (c.=1, CHCl$_3$).

Elemental analysis for C$_5$H$_6$O$_2$: Calculated (percent): C, 61.22; H, 6.16; N, 0.00. Found (percent): C, 61.12; H, 6.14; N, 0.00.

EXAMPLE 5

Resolution of (+)-2-methylenecyclopropane carboxylic acid 8.0 liters of filtrate from the formation of (—)-cinchonidine(—)-2-methylenecyclopropane carboxylate (crude) is concentrated under reduced pressure at 40° C. to .8 liter, filtered, and the filtrate further concentrated to dryness, keeping the temperature at 40° C. The residual solid weighs 74 grams and is recrystallized twice from the minimal amount of hot acetone:benzene (2:1) to give 48.0 grams of purified cinchonidine salt. The melting point is 163–165° C.

36.0 grams of the salt is liberated via the procedure employed in liberation of the l-acid to give 7.2 grams of (+)-2-methylenecyclopropane carboxylic acid, $$[\alpha]_D^{24}+34.8°$$

(neat), $[\alpha]_D^{24}$—38.1° (c.=1, CHCl$_3$).

We claim:
1. A process for preparing pure l 2-methylenecyclopropane carboxylic acid which comprises, in sequence, the steps of
   (a) resolving a racemic acid mixture of dl 2-methylenecyclopropane carboxylic acid by cooling a hot aqueous solution of said acid and cinchonidine, which solution is seeded with the cinchonidine salt of l 2-methylenecyclopropane carboxylic acid;
   (b) recrystallizing the resulting crude cinchonidine salt of l 2-methylenecyclopropane carboxylic acid from a hot aqueous solution; and

(c) liberating the pure l 2-methylenecyclopropane carboxylic acid from its salt.

References Cited

UNITED STATES PATENTS 2,956,077  10/1960  Carbon et al. _____ 260—468

OTHER REFERENCES

D'yakonov et al.: Zh. Obshch. Khim., 32, 928, 1962.
Bottini et al.: J. Org. Chem. Soc. 30, 3302, 1965.
Campbell et al.: J. Chem. Soc., 1945, p. 283.
Inove et al.: C. A. vol. 51, p. 236, 1957.
Eliel: Stereochemistry of Carbon Compounds, pp. 49–53, 1962.

LORRAINE A. WEINBERGER, Primary Examiner

R. GERSTL, Assistant Examiner

U.S. Cl. X.R.

260—284, 286 R, 294.7 B, 501.1; 424—267